United States Patent Office 3,433,650
Patented Mar. 18, 1969

3,433,650
DRY SOUP MIX
Harry W. Block, East Orange, N.J., and Paul B. Touher, Chicago, Ill., assignors to General Foods Corporation, White Plains, N.Y., a corporation of Delaware
No Drawing. Continuation-in-part of application Ser. No. 488,713, Sept. 20, 1965, which is a continuation-in-part of application Ser. No. 374,241, June 11, 1964, which is in turn a continuation-in-part of application Ser. No. 211,851, July 23, 1962. This application Jan. 12, 1967, Ser. No. 608,744
U.S. Cl. 99—124  3 Claims
Int. Cl. A23l 1/40

ABSTRACT OF THE DISCLOSURE

An instant dry soup mix having 5 to 35% fat-coated raw starch for thickening said soup to a cream-like consistency on reconstitution with hot water. The starch, preferably potato starch, has a gelatinization range of between 135° to 165° F. and a particle size of less than 200 mesh while the remaining soup solids have a particle size wherein at least 50% are between 40 to 100 mesh.

CROSS-REFERENCES TO RELATED APPLICATIONS

This application is a continuation-in-part of Ser. No. 488,713 filed Sept. 20, 1965 (now abandoned), which was a continuation-in-part of Ser. No. 374,241 filed June 11, 1964 (now abandoned), which was a continuation-in-part of Ser. No. 211,851 filed July 23, 1962 (now abandoned).

BACKGROUND

This invention relates to an improved dry soup mix capable of instant reconstitution with hot water into a soup of cream-like consistency.

Attempts have been made to produce a heavy-bodied, lump-free instant soup having a creamy consistency from a blend of dried food ingredients. Workers have achieved products offering a measure of convenience to the housewife, but all of the prepared cream-style products have suffered from one or more disadvantages. Many of the cream-style soups presently on the market are sold in cans in the form of a concentrated soup. These concentrates have obvious disadvantages in storage and packaging and, in some instances, must be simmered for periods as long as 5–20 minutes after addition of water in order to develop the requisite creaminess, flavor and eating qualities, thereby suffering the disadvantage of overcooking some of the soup ingredients. Dry soup mixes have been used but these mixes have not been able to produce a product having the degree of creaminess achieved by the conventional household cooked soup. Moreover, dry mixes have achieved viscosity or thick-like consistency by merely increasing the amount of solids in the reconstituted soup. This does not achieve a true creaminess in the reconstituted soup and presents problems of clumping, graininess, and other related problems on reconstitution.

It would, therefore, be highly desirable to produce a dry mix capable to relatively instant reconstitution with simple stirring on the addition of near-boiling water to the dry solids to give a lump-free, thick-bodied soup which achieves its creaminess from a source other than high solids content while having a texture and taste similar to a freshly prepared product.

SUMMARY OF INVENTION

It has now been discovered that a dry soup mix capable of reconstituting to a cream-like soup in 10–60 seconds in water above 180° F. can be produced by a composition comprising a free-flowing mixture of dehydrated food solids and between 5 to 35% by weight of an ungelatinized starch having a gelatinization range of 135° to 165° F., a particle size of less than 200 mesh U.S. Standard Sieve and being coated with a fatty hydrophobic substance which delays hydration of the starch on reconstitution while imparting flavor to the reconstituted solids, said remaining food solids having a particle size wherein at least 50% of the particles are between 40 and 100 mesh U.S. Standard Sieve.

In the case of a dry soup mix the viscosity or creaminess in the reconstituted soup should not be imparted to the soup by the solids level of soup ingredients. The thickening qualities of the soup should be derived from the raw starch thickener which is gelatinized by the heat of the reconstituting liquid. The starch must, therefore, be ungelatinized, bland in taste, highly water soluble, in powdered form (less than 200 mesh), and yet must not clump on addition of hot water to the mix. While the amount of starch used will vary with the type of soup, at least 5% by weight of ungelatinized starch must be present to give sufficient thickening of the soup but above 35% by weight of starch thickener will give a soup which is too thick or creamy. The starch must thus be rendered sufficiently dispersible to prevent clumping. This is accomplished by uniformly surface coating the starch with a fatty substance having sufficient immiscibility with water to delay starch hydration and gelatinization until the starch has been effectively dispersed in the reconstituting liquid and available for rehydration without clumping. This hydration should be delayed at least about 10 seconds. While not necessary, the soup solids may also be coated with a hydrophobic fat coating in order to prevent clumping of any fines present in the soup solids.

The coating material is taken from a fat composition such as butter, oleomargarine, vegetable oil and the like which will contribute desired flavor qualities to the reconstituted soup. Hydrophobic action is accomplished by only surface coating of the starch powder with fat. The fat need not permeate the interior portions of the solid particles to an extent which will destroy the rapid reconstitution properties of the solids. By controlling the fat coating a degree of dispersibility can be achieved which allows the raw starch to reconstitute in less than 60 seconds to a cream-like consistency without any danger of clumping.

Preferred among the raw starch thickeners used in this invention is bland, ungelatinized potato starch. This type of starch gives the desired cream-like character to the soup while not imparting any undesirable taste to the reconstituted product. The starch should undergo a minimum of heat treatment during its dehydration, remaining substantially ungelatinized and preferably the starch will not have lost its birefringence when viewed under polarized light. Typically, the dried starch will exhibit a Maltese cross pattern characteristic of ungelatinized starch when viewed under a Nicol prism. Other starches which can be used in this invention are rye starch, sweet potato starch, water chestnut starch and lotus root starch. The remaining starches, such as tapioca starch, corn starch, waxy maize starch, rice starch, hydrolyzed starch and pregelatinized starches will not rehydrate properly to give the desired creaminess to the soup.

It is a feature of this invention that a majority of the food solids (excluding the starch thickener) be at a critical particle size of between 40 and 100 mesh U.S. Standard Sieve. At sizes smaller than 100 mesh, the fat coating is ineffective in preventing clumping and texture of the reconstituted product tends to be slimy. At particle sizes above 40 mesh, the food solids do not hydrate properly and an undesirable product with insoluble lumps is attained. This critical particle size appears to be necessary due to the use of a near boiling reconstituting liquid (180° F. to 210° F.) which serves to gelatinize the starch and complete cooking of some of the food solids. At this high temperature the fat coating of the starch is not sufficient of itself to assure proper hydration. Hence, it is necessary to combine the fat coated raw starch thickener with precooked solids of a critical particle size.

In carrying out this invention, the dry mix ingredients for the soup may be blended with the fatty hydrophobic material to effect the desired degree of coating on the starch. During the blending operation, care is exercised to avoid premature liquefaction of the fatty material employed to furnish the hydrophobic properties to the discrete particles. In general, therefore, a gentle as distinguished from a vigorous blending is preferred for the small level of fat, typically between 2–20%, to surface-coat the particles. In many applications, a vigorous or rapid blending will cause an excess of liquefaction due to frictional heat developed which will result in a poorly dispersible and clumped product upon reconstitution. The proper blending speed will vary with the fat composition used. For example, a higher melting fat can be blended in a more vigorous manner for a longer period of time than a lower melting fat without detracting from the dispersion qualities of the dry particles. However, it is believed that vigorous and high speed blending for an extended period of time is undesirable in the case of any fat and can cause melting and consequent penetration of the fatty compounds into the interior of the particles to delay the hydration of the dry mix an excessively long time.

The composition of the present invention can be agglomerated, have fillers added, or otherwise adjusted in its bulk volume. A preferred means of adjusting the bulk density of the product to a uniform bulk volume for comparable reconstitution recipes and package sizes involves contacting the dry mix with steam to thereby agglomerate the same.

Description of Preferred Embodiments

EXAMPLE I.—INSTANT CHICKEN SOUP MIX (CREAM STYLE)

| Ingredients | Grams | Percent by weight |
|---|---|---|
| Raw Idaho potato starch | 4.39 | 27.29 |
| Non-fat dry milk solids | 2.04 | 18.89 |
| Salt | 2.25 | 13.99 |
| Hydrolyzed starch | 1.91 | 11.89 |
| Freeze-dried chicken | 1.40 | 8.74 |
| Chicken fat | 1.39 | 8.67 |
| Monosodium glutamate | 0.56 | 3.50 |
| Sugar | 0.40 | 2.46 |
| Hydrolyzed vegetable protein | 0.25 | 1.57 |
| Butter | 0.19 | 1.19 |
| Powdered onion | 0.13 | 0.79 |
| Dried celery powder in sugar | 0.067 | 0.42 |
| Vanilla color | 0.056 | 0.35 |
| Parsley flakes | 0.032 | 0.20 |
| White pepper | 0.005 | 0.03 |
| Turmeric | 0.0003 | 0.02 |
| | 16.073 | 100.00 |

The dry mix ingredients with the exception of the parsley flakes, freeze-dried chicken pieces, chicken fat, and butter, were ground and sifted through a #40 mesh U.S. Standard Sieve Screen. The sifted soup ingredients were then blended in a Hobart mixer at a paddle stirrer speed of 64 r.p.m. for 20 minutes. The chicken fat and butter ingredients were then added to the mixer and a wire whip was used at low stirrer speed (64 r.p.m.) for 5 minutes. Mixing was continued for 5 more minutes at a higher speed (128 r.p.m.) to assure complete dispersion of the fat with the blended ingredients. The ingredients which had a bulk density of 0.45 gm./cc. were then agglomerated to achieve a density of 0.35 gm./cc. The parsley flakes and freeze-dried chicken pieces were then added to the soup ingredients and mixed in the Hobart mixer at low speed (64 r.p.m.) for 5 minutes. The blended dry soup mix was then removed from the Hobart in a free-flowing and powdered form, except for the chunks of freeze-dried chicken and parsley flakes.

About 3 teaspoons (14.3 grams) of the dry soup mix were placed in a bowl, ⅔ cup (158 cc.) of boiling water was added, and the mixture stirred for several seconds. The dry soup mix reconstituted in less than one minute to give a smooth, non-grainy, cream-like consistency similar in all respects to a cream of chicken soup prepared by the conventional household cooking method. The soup did not loose its viscosity on standing.

Example II

Dry mixes identical to Example I were prepared with the exception that equivalent amounts of various starches were substituted for the raw potato starch. These soups were found to reconstitute in the following manner based on the starch used.

| Starch: | Reconstitution properties |
|---|---|
| Corn starch | Poor rehydration, not thick or creamy. |
| Rice starch | Poor rehydration, not thick or creamy. |
| Wheat starch | Poor rehydration, not thick or creamy. |
| Waxy maize starch | Poor rehydration, not thick or creamy. |
| Pregelatinized potato starch | Hydrates too fast, excessive lumping. |
| Pregelatinized corn starch | Hydrates too fast, excessive lumping. |
| Pregelatinized rice starch | Hydrates too fast, excessive lumping. |
| Pregelatinized wheat starch | Hydrates too fast, excessive lumping. |
| Pregelatinized waxy maize starch | Hydrates too fast, excessive lumping. |

EXAMPLE III.—INSTANT VEGETABLE SOUP MIX (CREAM-STYLE)

| Ingredients | Gram serving | Percent composition |
|---|---|---|
| Wheat Flour | 5.62 | 23.98 |
| Non-fat milk solids | 4.83 | 20.58 |
| Hydrogenated cottonseed oil | 3.38 | 14.39 |
| Corn, air dried | 2.32 | 9.91 |
| Salt | 2.30 | 9.80 |
| Raw Idaho potato starch | 1.69 | 7.19 |
| Sugar | .577 | 2.46 |
| Tomato powder | .506 | 2.15 |
| Monosodium glutamate | .450 | 1.92 |
| Corn starch | .378 | 1.61 |
| Hydrolyzed veget. protein | .338 | 1.44 |
| White onion powder | .281 | 1.20 |
| Puffed carrots | .225 | 0.96 |
| Celery powder | .202 | 0.863 |
| Celery stalk and leaf powder | .112 | 0.480 |
| Red bell pepper powder | .090 | 0.385 |
| Parsley flakes | .025 | 0.105 |
| Carrots, freeze-dried | .022 | 0.096 |
| Red Bell peppers, dried | .022 | 0.096 |
| White pepper | .011 | 0.048 |
| Garlic powder | .011 | 0.048 |
| | 23.390 | 100.000 |

The dried tomatoes were ground through a Fitzpatrick mill having a #80 mesh U.S. Standard Sieve Screen. The dried soup ingredients, with the exception of the parsley, carrots and red bell peppers, which are inlay ingredients present for the visual and textural properties, were then sifted through a #40 mesh U.S. Standard Sieve Screen. The dry ingredients, with the exception of oleomargarine and the inlay ingredients, were then mixed in a Hobart mixer at low speed with a paddle stirrer (64 r.p.m.) for 20 minutes. The oleomargarine was then added and mixed at low speed (64 r.p.m.) with a wire whip for a stirrer. Mixing was continued at a higher speed (128 r.p.m.) for 5 minutes. The ingredients were then agglomerated to achieve a bulk density of 0.35 gm./cc. The only ingredients were then added and mixed in the Hobart for 5 minutes at low speed (64 r.p.m.) with a paddle stirrer. The blended mix was then removed from the Hobart in a free-flowing form.

About 19.8 grams of dry soup mix was placed in a bowl, ⅔ cup (158 cc.) of boiling water was added, and the mixture stirred for several seconds. The dry mix reconstituted in less than a minute to a cream of vegetable soup similar in all respects to a freshly prepared household cooked product. The soup exhibited a smooth, non-lumpy and cream-like texture. The soup did not lose its viscosity on standing.

EXAMPLE IV.—INSTANT GREEN PEA SOUP MIX (CREAM-STYLE)

| Ingredients | Gram serving | Percent composition |
| --- | --- | --- |
| Dried precooked pea powder | 15.75 | 62.98 |
| Salt | 1.68 | 6.74 |
| Sugar | 1.40 | 5.62 |
| Raw potato starch | 1.39 | 5.58 |
| Dextrose | 1.12 | 4.50 |
| Hydrogenated vegetable oil | 1.12 | 4.50 |
| Hydrolyzed vegetable protein | 0.90 | 3.60 |
| Smoked torula yeast | 0.84 | 3.37 |
| Monosodium glutamate | 0.45 | 1.80 |
| Meatless flavor | 0.14 | 0.54 |
| Carboxy methyl cellulose | 0.11 | 0.45 |
| Powdered onion | 0.06 | 0.22 |
| White pepper powder | 0.02 | 0.09 |
| Green color | 0.002 | 0.01 |
| | 24.982 | 100.00 |

One part by weight of peas were mixed with 4 parts by weight water and cooked in an open pot until the peas were gelatinized. The slurry was then passed through a colloid mill having a #30 mesh screen and drum dried at a temperature of 300° F. The dried pea powder was granulated in a Fitzpatrick mill having a #40 mesh U.S. Standard Sieve Screen and the granulated powder was then sifted through a #40 mesh U.S. Standard Sieve Screen while being retained on a #100 mesh screen. The other dry mix ingredients, with the exception of the hydrogenated vegetable oil, were then sifted through a #40 mesh U.S. Standard Sieve Screen, and were then blended with the pea powder in a Hobart mixer with a paddle stirrer at low speed (64 r.p.m.) for 20 minutes. The hydrogenated vegetable oil was then added and mixed for 5 minutes at low speed, using a wire whip as a stirrer. Mixing was then continued at a higher speed (128 r.p.m.) for about 5 minutes.

About 22.3 grams of the dry soup mix were placed in a bowl, ⅔ cup of boiling water (158 cc.) was added, and the mixture stirred for several seconds. The dry mix reconstituted in less than a minute to give a pea soup having a smooth, non-lumpy, and cream-like consistency similar in all respects to a freshly prepared cream-style green pea soup. The soup did not lose its viscosity on standing.

EXAMPLE V.—INSTANT TOMATO SOUP MIX (CREAM STYLE)

| Ingredients | Gram serving | Percent composition |
| --- | --- | --- |
| Tomato flakes | 7.95 | 38.20 |
| Sugar | 2.87 | 13.81 |
| Raw potato starch | 2.37 | 11.39 |
| Dextrose | 2.25 | 10.81 |
| Salt | 1.84 | 8.84 |
| Flour | 1.69 | 8.11 |
| Butter | .764 | 3.67 |
| Hydrogenated cottonseed oil | .533 | 2.56 |
| White onion powder | .229 | 1.103 |
| Monosodium glutamate | .064 | .308 |
| White pepper | .038 | .184 |
| Garlic powder | .026 | .124 |
| Tomato flavor | .024 | .114 |
| Parsley | .024 | .113 |
| Celery | .017 | .081 |
| Worcestershire flavor | .017 | .081 |
| Romano cheese | .012 | .059 |
| Mustard | .011 | .054 |
| Cheddar cheese | .009 | .043 |
| Toasted onion powder | .007 | .032 |
| Cinnamon | .005 | .022 |
| Imitation cheese flavor | .002 | .011 |
| | 20.752 | 100.000 |

The dried tomatoes were ground through a #80 U.S. Standard Sieve Screen by use of a Fitzpatrick mill at high speed and then sifted through a #80 mesh screen. The dry mix ingredients with the exception of the hydrogenated cottonseed oil, were then sifted through a #40 mesh U.S. Standard Sieve Screen and then were mixed with the dried tomato powder in a Hobart Mixer with a paddle stirrer at low speed (64 r.p.m.) for 20 minutes. The hydrogenated cottonseed oil was then added to the Hobart and mixed for 5 minutes at low speed using a wire whip as a stirrer. Mixing was continued at higher speed (128 r.p.m.) for 5 more minutes. The mixture was then agglomerated to achieve a bulk density of 0.35 gm./cc.

About 20.3 grams of the soup mix were placed in a bowl, ⅔ cup (158 cc.) of boiling water was added, and the mixture was stirred briskly for several seconds. The soup reconstituted in less than a minute to a smooth, non-lumpy, and cream-like texture and was similar in all respects to a freshly prepared cream of tomato soup. The soup did not lose its viscosity on standing.

EXAMPLE VI.—INSTANT MUSHROOM SOUP MIX (CREAM-STYLE)

| Ingredients | Gram serving | Percent composition |
| --- | --- | --- |
| Non-fat dry milk solids | 5.00 | 28.30 |
| Raw potato starch | 4.21 | 23.81 |
| Hydrogenated vegetable oil | 1.66 | 9.44 |
| Cottonseed oil | 1.65 | 9.35 |
| Salt | 1.35 | 7.63 |
| Hydrolyzed starch | 1.07 | 7.63 |
| Caramelized lactose | 1.07 | 6.04 |
| Monosodium glutamate | 0.56 | 3.18 |
| Hydrolyzed vegetable protein | 0.56 | 3.18 |
| Dried mushroom pieces | 0.28 | 1.59 |
| Tomato powder | 0.111 | 0.63 |
| Freeze-dried butter flavor | 0.057 | 0.32 |
| Dried mushroom powder | 0.057 | 0.32 |
| Dried onion powder | 0.028 | 0.16 |
| Butterscotch color | 0.002 | 0.01 |
| | 17.665 | 100.00 |

The dried tomatoes were ground through a Fitzpatrick mill having a #80 U.S. Standard Sieve Screen. The tomato crystals were then sifted through a #80 mesh U.S. Standard Sieve Screen. The remaining dry ingredients, with the exception of the freeze-dried mushroom pieces, hydrogenated vegetable oil, and cottonseed oil, were then sifted through a #40 mesh U.S. Standard Sieve Screen. These ingredients were then dry-blended in a Hobart with a paddle stirrer at low speed (64 r.p.m.) for 20 minutes. The hydrogenated vegetable oil and cottonseed oil were then added and mixed for 5 minutes at low speed (64 r.p.m.) using a wire whip as a stirrer. Mixing was continued at higher speed (128 r.p.m.) for 5 minutes. The mixture was agglomerated to a bulk density of 0.35 gm./cc. The mix was then placed in the Hobart, mushroom pieces were then added, and the mixture blended at 128 r.p.m. for another 5 minutes.

About 15.7 grams of the dry soup mix were placed in a bowl, ⅔ cup (158 cc.) of boiling water was added, and the mixture stirred for several seconds. The dry mix reconstituted in less than a minute to a non-lumpy, smooth, and cream-like consistency and was similar in all respects to a freshly prepared cream of mushroom soup. The soup did not lose its viscosity or creaminess on standing.

While this invention has been described by reference to specific examples, reference should be had to the appended claims for a definition of its scope.

What is claimed is:

1. A dry, powdered, soup mix capable of reconstituting to a cream-like soup in 10–60 seconds in water above 180° F. comprising a free-flowing mixture of dehydrated food solids and 5 to 35% by weight ungelatinized starch, said starch having a gelatinization range of 135° to 165° F., a particle size of less than 200 mesh U.S. Standard Sieve, and being surface coated with a fatty hydrophobic substance which delays hydration of the starch on reconstitution while imparting flavor to the reconstituted solids, said remaining food solids having a particle size wherein at least 50% of the particles are between 40 and 100 mesh U.S. Standard Sieve.

2. The product of claim 1 wherein the starch is potato starch.

3. The product of claim 2 wherein the fat is at a level of 2 to 20% by weight of the dry soup mix.

References Cited

UNITED STATES PATENTS 3,116,151   12/1963   Giddey _____ 99—124

FOREIGN PATENTS 224,363   2/1958   Australia.

A. LOUIS MONACELL, *Primary Examiner.*

J. M. HUNTER, *Assistant Examiner.*